Jan. 1, 1963  R. C. NEMETH  3,070,992
PRESSURE GAUGE AND METHOD OF OPERATION
Filed May 25, 1959  3 Sheets-Sheet 1
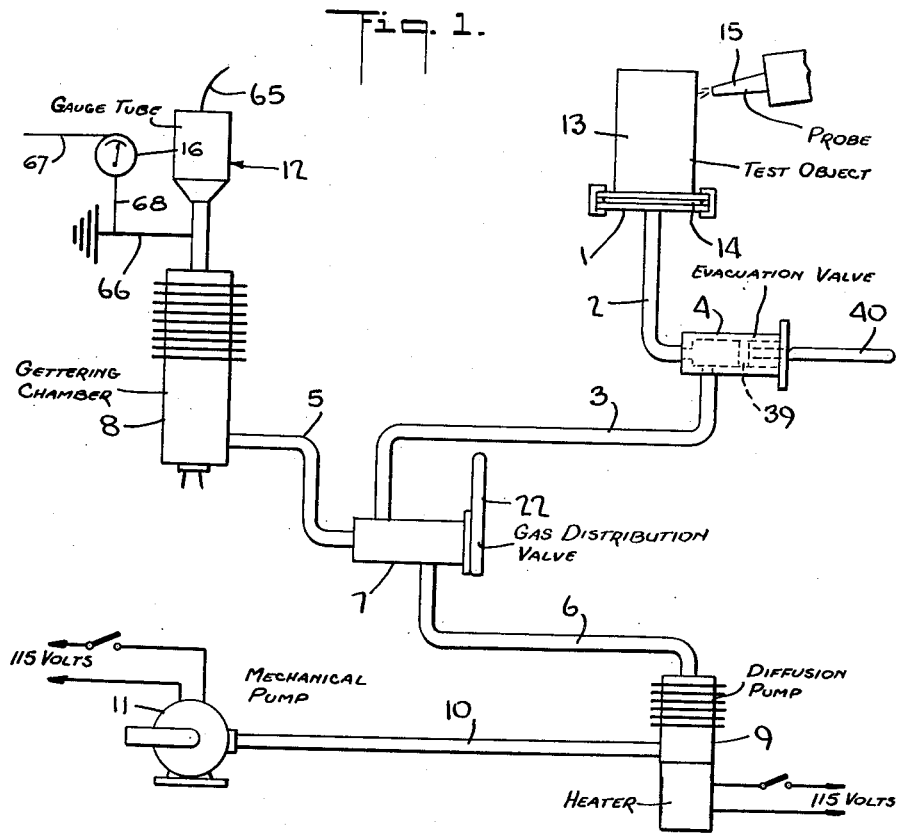
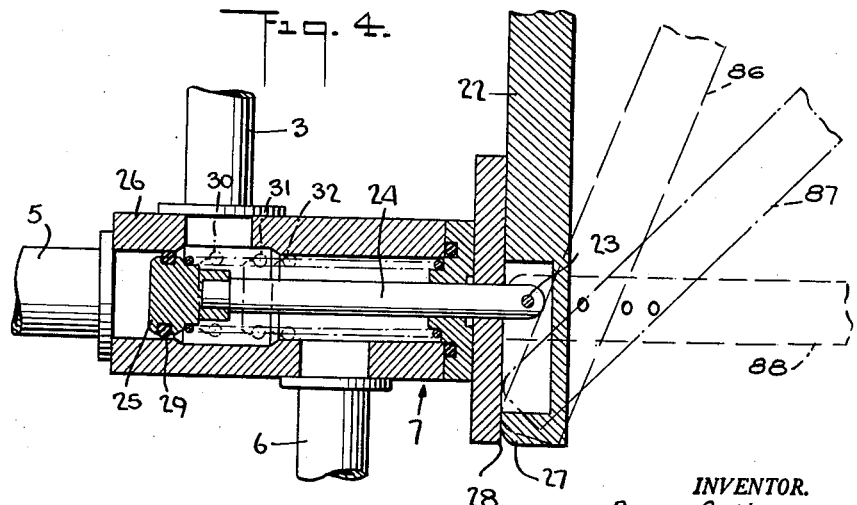
INVENTOR.
ROBERT C. NEMETH
BY
his ATTORNEY

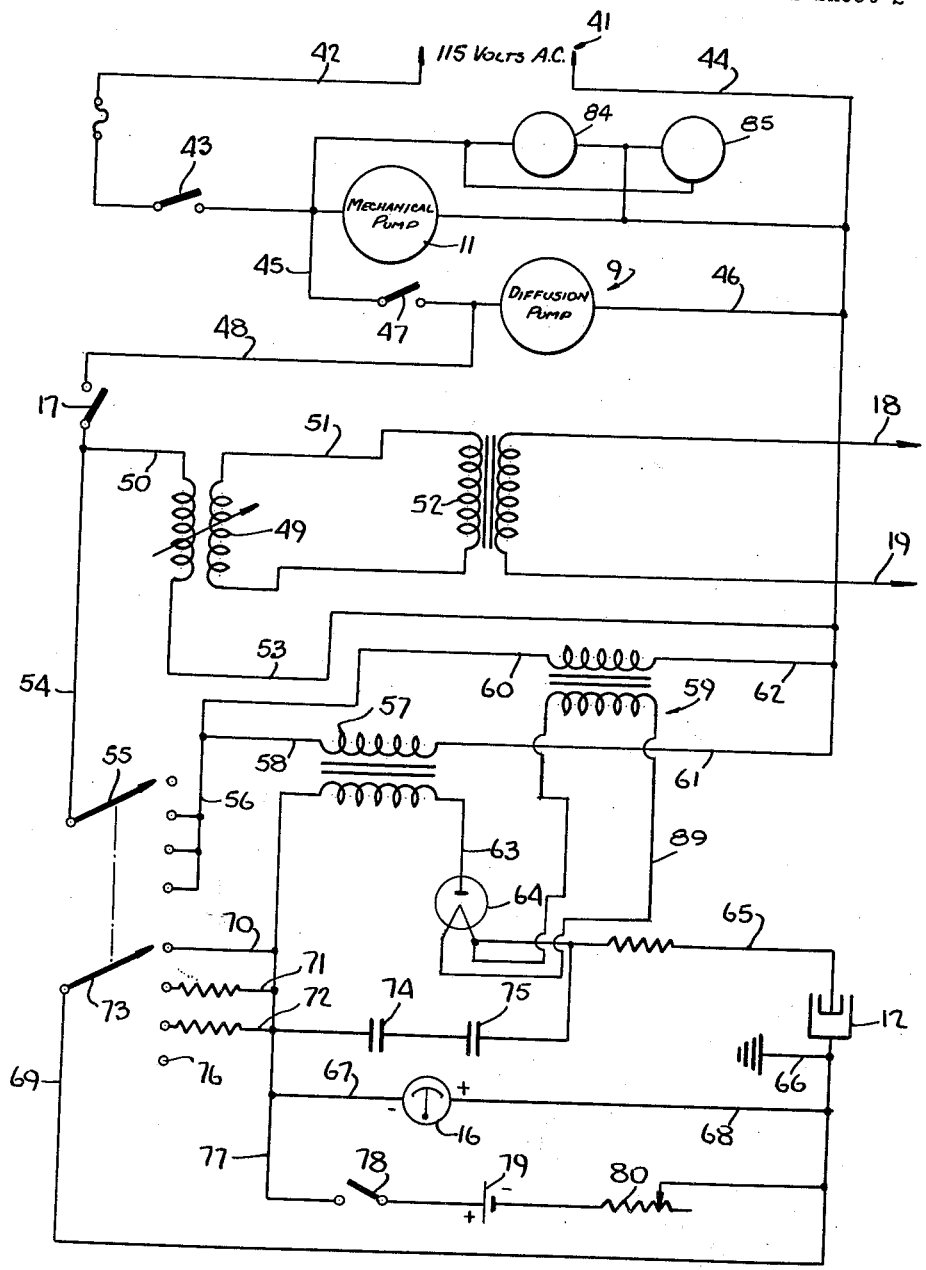

Jan. 1, 1963 R. C. NEMETH 3,070,992
PRESSURE GAUGE AND METHOD OF OPERATION
Filed May 25, 1959 3 Sheets-Sheet 3
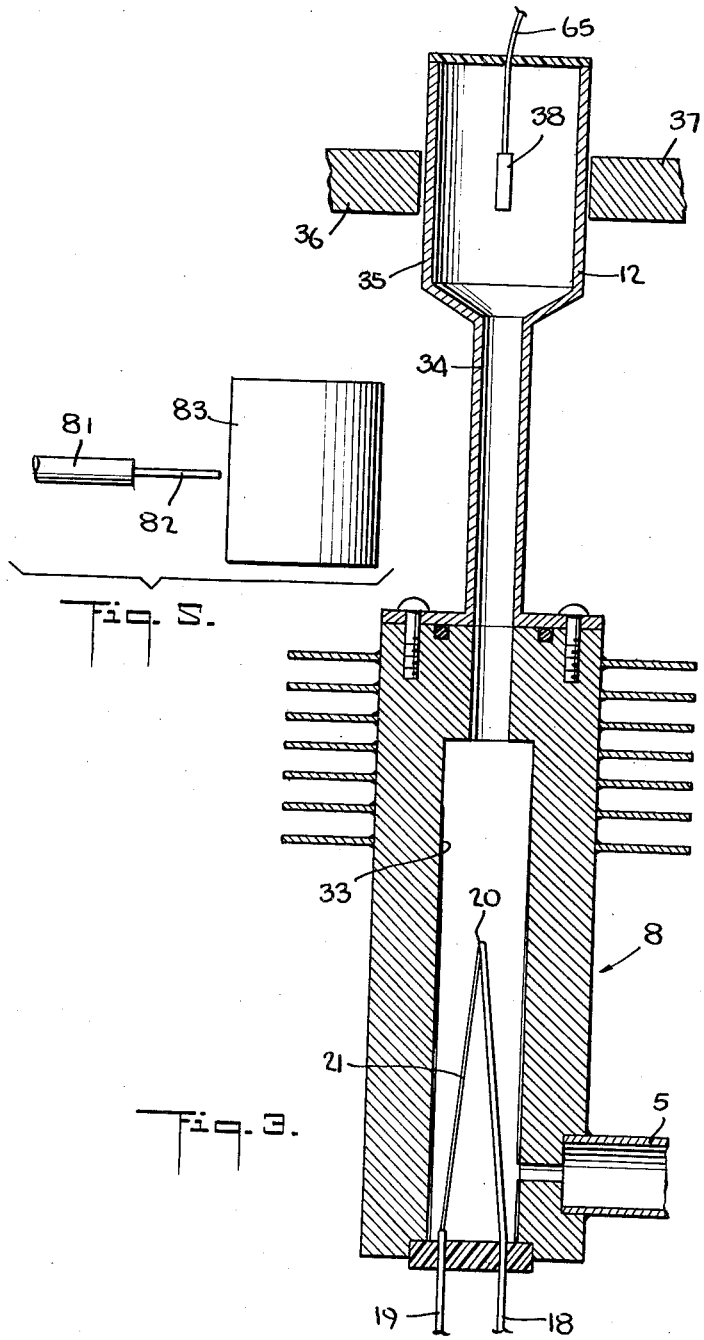
INVENTOR.
ROBERT C. NEMETH
BY Gustav Drews
his ATTORNEY

# United States Patent Office 3,070,992
Patented Jan. 1, 1963

3,070,992
PRESSURE GAUGE AND METHOD
OF OPERATION
Robert C. Nemeth, 6 Nimitz St., Huntington, N.Y.
Filed May 25, 1959, Ser. No. 815,554
6 Claims. (Cl. 73—40.7)

This invention releates to partial pressure gauges in general and more particularly to pressure gauges which can be used as pressure gauges per se on high vacuum pumps as part of a leak detecting system and also as part of a gas detecting system to distinguish active from inert gases.

Among the objects of the present invention it is aimed to provide an improved pressure gauge which contemplates the use of a titanium filament or filaments in a container associated with a gauge tube such as a cold cathode vacuum gauge.

It is still another object of the present invention to provide an improved leak detecting system including the improved pressure gauge forming one of the distinguishing features of the present invention whereby initially, by pumps such as mechanical and diffusion pumps, the filament chamber is evacuated, thereupon the filaments, such as titanium filaments, electrically energized, the pump system cut off, a device such as a container connected to the pressure gauge, and a sprayer of an inert gas, such as argon gas, directed to the outer surface of the device such as the container to be tested, relying upon the contingency that if a leak existed in the container, the inert gas would enter the leak and the pressure in the pressure gauge increase the nearer the sprayer is to the leak.

It is still another object of the present invention to provide an improved process for gauging pressure.

These and other features, capabilities, and advantages of the present invention will appear from the subjoined, detailed description of one specific embodiment thereof illustrated in the accompanying drawings, in which:

FIG. 1 is a diagrammatic view illustrating the improved pressure gauge in association with a container to be tested for leakage.

FIG. 2 is a wiring diagram of a system such as illustrated in FIG. 1.

FIG. 3 is an enlarged section partly shown schematically of the filament chamber, and of a cold cathode vacuum gauge constituting the pressure gauge of the system illustrated in FIG. 1.

FIG. 4 is a fragmental sectional view of the signal valve.

FIG. 5 is an exploded elevation of a modification of the testing object and testing nozzle.

When the pressure gauge constituting the main feature of the present invention is used with a leak detecting system, this system consists as illustrated in FIG. 1, primarily in a platform 1 at the end of the conduit 2 which is connected to the conduit 3 by the evacuation valve 4. This conduit 3 in turn is connected to the conduits 5 and 6 by the signal gas distribution valve 7. The conduit 5 extends from the signal valve 7 to the filament or gettering chamber 8 while the conduit 6 in turn extends from the valve 7 to the diffusion pump 9. The diffusion pump 9 in turn is connected by the conduit 10 to the mechanical pump 11. The filament or gettering chamber 8 is interposed between the conduit 5 and the pressure gauge or gauge tube 12 in the present instance illustrated as a cold cathode discharge vacuum gauge in FIG. 3. When the system is used for detecting a leak, the device such as the container 13 is connected to the platform 1 by any suitable leak proof seal such as a rubber O ring 14 and thereupon when the system is in operation, a probe gas such as argon gas sprayed on the outer face of the container from the supply through the nozzle 15.

In the operation of this system, the evacuation valve 4 first is actuated to shut off communication between the conduits 2 and 3 and the signal gas distribution valve 7 is actuated to shut off communication between the conduits, 5 from 3 and 6. Thereupon the mechanical pump 11 is initiated and when the proper evacuation has been obtained, about .5 mm. of mercury, determined by the discontinuance of the gurgling in the mechanical pump 11, the diffusion pump 9 is connected into series with the mechanical pump 11 and the evacuating operation continued for about fifteen minutes when the signal valve 7 will be actuated to establish communication between the conduits 3 and 5 and the conduit 6. Thereupon the evacuating operation continues until the meter 16 indicates a pressure of about $1\times10^{-3}$ to $1\times10^{-6}$ mm. of mercury absolute pressure. Thereupon the filament switch 17, FIGS. 2 and 3, is closed to establish current in the conductors 18 and 19. The conductor 18 is connected at 20 to a titanium filament 21 which is connected to the conductor 19. The evacuating operation will then continue until the pressure in the gettering chamber 8 and gauge tube 12 has been reduced to $1\times10^{-3}$ to $1\times10^{-6}$ mm. of mercury absolute pressure. Thereupon, if the system is to be used for determining a leak, the signal valve 7 will be actuated to shut off communication between the conduit 5 and conduit 6 and continue communication between the conduits 3 and 6 and then actuate the valve 4 to establish communication between the conduits 2 and 3 and of course with the interior of the container 13. The low pressure pumps 11 and 9 will continue their evacuating action until the pressure in the container 13 via the conduits 2 and 3 has been reduced to $5\times10^{-2}$ mm. of mercury absolute pressure. Thereafter the signal valve 7 will be actuated to establish divided flow between conduits 3, 5 and 6. In case of large leaks the communication between the pumps 11, 9 and the gettering chamber 8 will continue as aforesaid. In case of minute leaks, however, it has been found desirable to actuate the valve 7 to shut off communication between the conduit 6 and the conduit 5 and rely entirely upon the pumping action exercised by the gettering chamber 8.

For detecting leaks according to the present invention, a sprayer having the nozzle 15 of an inert gas such as agron, helium, neon, and the like may be directed against the outer face of the container 13. It will be found that if there is a leak in the container 13, the argon will enter the container 13 through the leak and pass into the gettering chamber 8, and since the argon so entering the chamber 8 is not eliminated by the coating on the wall of the chamber 8, the increase in pressure in the gauge 12 will be registered upon the conventional D.C. current meter 16 shown in FIG. 2. In accordance with convention, the sprayer nozzle 15 will be moved around the container to show where the greatest increase occurs which will coincide with the position of the nozzle 15 nearest to or at the leak.

The control of signal valve 7 is effected through the handle 22 which is fulcrumed at 23 to the stem 24 having the valve head 25 which operates in the valve chamber 26, see FIG. 4. In other words, when the handle 22 is in its upright position, that shown in full lines in FIG. 4, the valve head 25 will shut off communication from the conduit 5 to both the conduits 3 and 6 and the initial evacuation will occur which will merely reduce the pressure in the container 13. Thereupon the handle 22 is raised so that the O ring gasket 29 will rise to the dotted line position 30 where communication will be established between the conduit 5 and both of the conduits 3 and 6, but slightly restricted to conduit 5. This position of the valve head 25 corresponds to the position of the same when performing the initial leak test. If the leak can be detected in this position of the valve head 25, it will be unnecessary to test any further. If the leak is not detected in the position 30 of the O ring gasket 29, the handle is raised into the position where the gasket 29 coincides with the dotted line position 31 when the communication to the conduits 3 and 5 is unrestricted, but slightly restricted with regard to the conduit 6. In this position, the evacuation or pumping action will be exercised primarily by the gettering chamber 8 and the pressure gauge 12. The gettering chamber 8 is relied upon primarily to pump out the residual gas and the gauge 12 to pump out the inert gas. If difficulty is still encountered in detecting the leak, then the handle is moved into the position where the gasket 29 of the valve head 25 coincides with the dotted line position 32 in the valve chamber 26 where communication to the conduit 6 is entirely shut off but a free and unobstructed passage afforded between the conduits 5 and 3 so that in this position there will be no leakage or flow of any of the gases in the gettering chamber 8 and gauge 12 to the pumps 9 and 11 and the gettering chamber 8 and gauge 12 relied on exclusively for withdrawing the gases from the container 13. When the mechanical pump 11 and diffusion pump 9 are in operation, the lamps 84 and 85 will be energized. These lamps 84 and 85 however, may be omitted without affecting the operation of the present mechanism. As indicated in FIG. 4, the first dash and dot line position 86 of the handle 22 corresponds to the position of the O ring 29 at the dotted line position 30. The dash and dot line position 87 of the handle 22 corresponds to the dotted line position 31 of the O ring 29 and the dash and dot line position 88 corresponds to the dotted line position 32 of the O ring 29.

From the foregoing it will thus be seen that the position of the valve head 25 will be located in the full line position shown in FIG. 4 initially to enable the pumps 9 and 11 to withdraw the gases from the container 13 and substantially evacuate the same. The position of the valve head 25 where its gasket 29 coincides with the dotted line position 30 will be obtained for an initial test for a leak, the position of the valve head 25 where the gasket coincides with the dotted line position 31 where a little difficulty is encountered in determining the leak, and the valve head 25 actuated into the position where the gasket 29 coincides with the dotted line position 32 when extreme difficulty is encountered in determining the leak.

The unique feature of the present invention is the arranging of the gettering chamber 8 in series with the pressure gauge 12. In the gettering chamber 8 due to the reaction of the titanium filament 21 when heated, it will vaporize and form a coating on the inner wall 33 which may be composed of brass or the like metal. When the titanium gas is so vaporized and deposited upon the inner face of the wall 33 it will either adsorb, absorb, or chemisorb the residual gas and vapors, except of course the inert gases, leaving only the inert gases and in the present instance, the argon gas being used in the sprayer by way of the nozzle 15 to pass into the pressure gauge 12. The argon gas will pass into the pressure gauge 12 through the neck 34, into the chamber 35 and past the configuration of the magnetic poles 36 and 37 and pressure gauge anode 38 to form ions which will travel to the interior face of the wall 35 composed of any conductive metal, such as aluminum, copper, or the like. The reaction on the configuration of the pressure gauge 12 to wit on the magnetic poles 36 and 37 and pressure gauge anode 38 will reflect the pressure in the chamber 35 on the meter 16.

The evacuation valve 4 also may be manually operated. The passage from the conduit 2 to the conduit 5 will be shut off by the valve head 39 through the handle 40 when it is desired to replace the test object such as the container 13. On the other hand after the test object, to wit, the container 13 is positioned on the platform 1, then the handle 40 will be actuated to move the valve head 39 into the position shown in FIG. 1 to establish communication between the conduits 2 and 3.

Excellent results will be achieved when a wiring diagram such as illustrated in FIG. 2 is used. According to this diagram, a source of current, to wit, 115 volts A.C. at 41 is connected by the conductor 42 to the mechanical pump 11 having a switch 43 in the conductor. The source of current 41 in turn is connected by the conductor 44 to the mechanical pump 11. In turn the conductor 42 is connected by the conductor 45 to the diffusion pump 9 and the conductor 44 is connected by the conductor 46 to the diffusion pump 9. A switch 47 is provided in the conductor 45. The source of current 41 is connected by the conductors 42, 45 and 48 to the power-on switch 17 for the filament circuit which in turn is connected to the variac or variable transformer 49 by the conductor 50. The variable transformer 49 is connected by the conductor 51 to the filament transformer 52 to supply the voltage to the gettering chamber 8. The variable transformer 49 is also connected by the conductor 53 to the conductor 44 back to the source of current 41. The filament transformer 52 is connected by the conductors 18 and 19 to the gettering chamber 8. The conductor 54 is connected by the switch 55 to the conductor 56 which is connected to the high voltage transformer 57 by the conductor 58 and to the filament transformer 59 by the conductor 60 to supply the voltage to the rectifier 64. This voltage transformer 57 is connected by the conductor 61 to the main conductor 44 back to the source of current 41 and the filament transformer 59 is connected by the conductor 52 to the main conductor 44. The high voltage transformer 57 is connected by the conductor 63 to the diode or half wave rectifier 64 which in turn is connected by the conductor 65 to the pressure gauge 12 which pressure gauge is connected to ground by the conductor 66. The function of the rectifier 64 is to supply the necessary D.C. high voltage to the anode 38 of the pressure gauge 12. The conductor 63 of the high voltage transformer 57 is connected by the conductor 67 to the meter 16 which meter in turn is connected by the conductor 68 to the conductor 66 connected to ground. In the aforesaid transformers, the conductors 50 and 53 constitute the primary winding and the conductor 51 the secondary winding of the variable transformer 49. The same conductor 51 in turn constitutes the primary winding and the conductors 18 and 19 constitute the secondary winding of the filament transformer 52. The conductors 60 and 62 constitute the primary winding and the conductor 89, the secondary winding of the filament transformer 59 and finally, the conductors 58 and 61 constitute the primary winding and the conductor 63 constitutes the secondary winding of the high voltage transformer 57. The conductor 69 in turn is connected to the conductor 63 of the high voltage transformer 57 through the conductors 70, 71 and 72, the contacts of which conductors are adapted to be connected to the switch arm 73. The conductor 69 in turn is also connected to the conductor 66 and to ground. When the switch arm 73 is connected to the conductor 71 and 72, it will shunt out the current to the meter 16. When it is connected to the conductor 70 which is the off position, the high voltage condensers 74 and 75 will be shorted to ground through the conductor 69. In turn when the switch arm 73 is in engagement with the contact 76, then the meter will not be shunted and the meter 16 will read its full value.

When there is an extremely slight leakage it may be desirable to include the conductor 77 which is connected to the conductor 67 of the meter 16 and is also connected to the conductor 66 to ground. This conductor 77 has connected to it a switch 78, a conventional one and one-half volt battery 79, and a potentiometer 80 in which case when closing the switch 78, the output can be balanced by adjusting the potentiometer 80 to correct the reading of the meter 16.

In other words, if there is sufficient inert gases in the atmosphere to affect the reading of the meter 16 without the supply introduced through the nozzle 15 into the test object 13, this will be registered before the conduit 3. The circuit through the conductor 67 constitutes an electrical background eliminator to enable reducing the reading on the meter 16 to eliminate the pressure created by the argon that might be in the atmosphere or gases that might be evolved from the gauge elements. When there is such a sufficient amount of gas evolved by the gauge elements, the needle will register so high that it will be difficult if not impossible to detect the increased pressure that results from the introduction of argon gas through the nozzle 15. By cutting in the circuit through the conductor 77, the needle may be positioned on a more sensitive area so that smaller meter deflections can be read.

The pressure gauge 8 and cold cathode vacuum gauge for gauge tube 12 shown in FIG. 3 are interposed between the conductors 18, 19 in FIG. 2 and the conductor 65 in which conductors there is located the switch 17, see the upper left hand side of FIG. 2. The gettering chamber 8 illustrated in FIG. 1 is not illustrated in FIG. 2 since it is connected to the conductors 18, 19 which are to the right of the wiring diagram illustrated in FIG. 2.

The method of detecting leaks as aforesaid is of course indicative of one specific way in which the invention can be used. It is conceivable that the test object can be filled with an inert gas and separated from the system and then the conduit 2 provided with a nozzle having a small orifice such as illustrated in FIG. 5 where the conduit 81 replaces the conduit 2 and is not connected via the platform 1 to the test object and the conduit 81 in this case is provided with the nozzle 82 having a fine orifice to scan the outer face of the container 83 constituting the test object which is filled with an inert gas.

It is obvious that various changes and modifications may be made to the details of construction without departing from the general spirit of the invention as set forth in the appended claims.

I claim:

1. The combination of a first conduit for receiving a chambered object to be tested for leaks, a diffusion pump connected to said conduit, a mechanical pump, a second conduit for connecting said diffusion pump to said mechanical pump, said first conduit, diffusion pump, second conduit, and mechanical pump succeeding one another in series to enable said diffusion pump and mechanical pump initially to evacuate said chambered object a gettering chamber having a titanium coated wall, a third conduit connecting one end of said gettering chamber to said first conduit to cause the gas from the chambered object to contact said titanium coated wall, a low pressure gauge connected to the other end of said gettering chamber to receive the gas after the gas has contacted said titanium coated wall, said first conduit, third conduit, gettering chamber and low pressure gauge succeeding one another in series to confine the passage of gas from the chambered object to the low pressure gauge a sprayer spraying an inert gas on the outer surface of the chambered object to be tested, and means including valves successively operating said mechanical pump, diffusion pump, gettering chamber, and low pressure gauge initially to effect the evacuation of said gettering chamber, said mechanical pump and diffusion pump to effect the initial evacuation of said chambered object, and said mechanical pump, diffusion pump, gettering chamber and low pressure gauge to transfer the gas in said chambered object to the atmosphere and to said low pressure gauge.

2. The combination of a first conduit for receiving a chambered object to be tested, a second conduit, an evacuation valve connecting said second conduit to said first conduit, a gas distribution valve, said second conduit connecting said gas distribution valve to said evacuation valve, a diffusion pump, a third conduit connecting said diffusion pump to said gas distribution valve, a mechanical pump, a fourth conduit connecting said mechanical pump to said diffusion pump, a gettering chamber, a fifth conduit connecting said gettering chamber to said gas distribution valve, a low pressure gauge connected to said gettering chamber, said evacuation valve being operable to disconnect the second conduit from said first conduit when changing the test object, said gas distribution valve being operable initially to connect said second conduit to said third conduit secondly to connect said second, third, and fifth conduits to one another and finally to shut off communication to said third conduit, said mechanical pump, diffusion pump, gettering chamber and low pressure gauge simultaneously operating to evacuate the contents of the object being tested, a device for spraying an inert gas on the outer face of the object being tested to enable the mechanism to draw the inert gas through a leak in the object being tested, said gettering chamber eliminating the residual gases and said low pressure gauge indicating an increase in pressure when the inert gas passes through a leak in the object being tested, said distribution valve shutting off said third conduit, diffusion pump, fourth conduit and mechanical pump from communication with said chambered object to enable all of the gas from said chambered object to pass to said low pressure gauge.

3. The combination of a mechanism for detecting a leak in a chambered object having an inert gas therein, said mechanism having a first conduit for receiving the inert gas through a leak in the object being tested, a second conduit, an evacuation valve connecting said second conduit to said first conduit, a gas distribution valve connected to said second conduit, a diffusion pump, a third conduit connecting said diffusion pump to said gas distribution valve, a mechanical pump, a fourth conduit connecting said mechanical pump to said diffusion pump, a gettering chamber, a fifth conduit for connecting said gas distribution valve to said gettering chamber, a low pressure gauge connected to said gettering chamber, said mechanical pump, diffusion pump, gettering chamber and low pressure gauge drawing the inert gas into said low pressure gauge, said low pressure gauge indicating the increase in pressure produced when said inert gas is received, said distribution valve shutting off said third conduit, diffusion pump, fourth conduit and mechanical pump from communication with said chambered object to enable all of the gas from said chambered object to pass to said low pressure gauge.

4. The combination of a first conduit for receiving a chambered object to be tested for leaks, a diffusion pump connected to said first conduit, a second conduit a mechanical pump, said first conduit, diffusion pump, and mechanical pump succeeding one another in series to enable said diffusion pump and mechanical pump initially to evacuate said chambered object, said second conduit connecting said diffusion pump to said mechanical pump, a gettering chamber, a third conduit connecting said gettering chamber to said first conduit, a low pressure gauge connected to said gettering chamber, said first conduit, third conduit, gettering chamber and low pressure gauge succeeding one another in series to confine the passage of gas from the chambered object to the low pressure gauge, a sprayer spraying an inert gas on the outer surface of the chambered object to be tested and means including valves operating said mechanical pump, diffusion pump, gettering chamber, and low pressure gauge initially to effect the evacuation of said gettering chamber, said mechanical pump and diffusion pump to effect the initial evacuation of said chambered object, and said gettering chamber and low pressure gauge to transfer the gas in said chambered object to said latter gauge.

5. For use in testing for leaks in a chambered container, a gettering container having a base at one end, a gettering film on the inner wall surface, and a gettering filament extending from said base the major length of the gettering container, a conduit connecting said chambered container to said base of said gettering container and extending at right angles to the length of said filament, a low pressure gauge connected to the other end of said gettering container, a valve connected to said conduit, a low pressure pump connected to said valve and in turn to said chambered container and said gettering container, said valve controlling the passage from said low pressure pump to said gettering container to the exclusion of said chambered container, also controlling the passage of gas from said chambered container to said gettering container to the exclusion of said pump, and from said pump to both said chambered container and said gettering container, said gettering container in turn confining the passage of gas from said conduit to said low pressure gauge throughout the full length of said gettering container.

6. For use in testing for leaks in a chambered container, containing inert gas, a gettering container having a base at one end, a gettering film on the inner wall surface, and a gettering filament extending from said base the major length of the gettering container, a conduit connecting said chambered container to said base of said gettering container and extending at right angles to the length of said filament, a low pressure gauge connected to the other end of said gettering container, a valve connected to said conduit, a low pressure pump connected to said valve and in turn to said chambered container and said gettering container, said valve controlling the passage from said low pressure pump to said gettering container to the exclusion of said chambered container, also controlling the passage of gas from said chambered container to said gettering container to the exclusion of said pump, and from said pump to both said chambered container and said gettering container, said gettering container in turn confining the passage of gas from said conduit to said low pressure gauge throughout the full length of said gettering container.

References Cited in the file of this patent

UNITED STATES PATENTS

| | | |
|---|---|---|
| 2,486,199 | Nier | Oct. 25, 1949 |
| 2,507,321 | Sherwood | May 9, 1950 |
| 2,526,038 | Nelson | Oct. 17, 1950 |
| 2,633,739 | Potts | Apr. 7, 1953 |
| 2,675,493 | Grobel | Apr. 13, 1954 |
| 2,745,059 | Gauger | May 8, 1956 |
| 2,796,555 | Conner | June 18, 1957 |
| 2,854,625 | Dudley et al. | Sept. 30, 1958 |
| 2,863,315 | Penning | Dec. 9, 1958 |

OTHER REFERENCES

Electrical Equipment, page 1, July 1953.
Journal of Applied Physics, pp. 39–41, January 1947.
Beckman Instruments, Inc., Bulletin 483.